(12) United States Patent
Lee et al.

(10) Patent No.: US 12,537,066 B2
(45) Date of Patent: Jan. 27, 2026

(54) NONVOLATILE MEMORY DEVICE AND OPERATION METHOD THEREOF

(71) Applicants: SK hynix Inc., Icheon (KR); Korea Advanced Institute of Science and Technology, Daejeon (KR)

(72) Inventors: Jung Woo Lee, Icheon (KR); Yang Kyu Choi, Seoul (KR); Ji Man Yu, Daejeon (KR)

(73) Assignees: SK hynix Inc., Icheon (KR); Korea Advanced Institute of Science and Technology, Daejeon (KR)

( * ) Notice: Subject to any disclaimer, the term of this patent is extended or adjusted under 35 U.S.C. 154(b) by 317 days.

(21) Appl. No.: 18/191,858

(22) Filed: Mar. 28, 2023

(65) Prior Publication Data

US 2023/0352104 A1  Nov. 2, 2023

(30) Foreign Application Priority Data

Mar. 29, 2022 (KR) .................. 10-2022-0039113

(51) Int. Cl.
| | |
|---|---|
| *G11C 16/04* | (2006.01) |
| *G11C 16/10* | (2006.01) |
| *G11C 16/14* | (2006.01) |
| *G11C 16/34* | (2006.01) |
| *H10D 30/43* | (2025.01) |
| *H10D 30/67* | (2025.01) |
| *H10D 30/69* | (2025.01) |
| *H10D 62/10* | (2025.01) |

(52) U.S. Cl.
CPC ...... *G11C 16/3404* (2013.01); *G11C 16/0466* (2013.01); *G11C 16/10* (2013.01); *G11C 16/14* (2013.01); *H10D 30/43* (2025.01); *H10D 30/6735* (2025.01); *H10D 30/694* (2025.01); *H10D 62/121* (2025.01)

(58) Field of Classification Search
CPC . G11C 16/3404; G11C 16/0466; G11C 16/10; G11C 16/14
See application file for complete search history.

(56) References Cited

U.S. PATENT DOCUMENTS

| | | | |
|---|---|---|---|
| 9,275,744 B1 | 3/2016 | Cartier et al. | |
| 2019/0147960 A1* | 5/2019 | Menezes | G11C 16/0433 365/185.12 |
| 2022/0399367 A1* | 12/2022 | Kim | H10B 43/10 |
| 2023/0116928 A1* | 4/2023 | Park | G11C 16/0483 365/185.29 |

FOREIGN PATENT DOCUMENTS

KR  101846477 B1  4/2018

* cited by examiner

*Primary Examiner* — Pho M Luu

(57) ABSTRACT

A nonvolatile memory device and an operating method thereof are disclosed. An operating method of a nonvolatile memory device may comprise providing the nonvolatile memory device including a memory transistor, the memory transistor including a source, a drain, a channel disposed between the source and the drain, and a first insulating layer, a charge storage layer, a second insulating layer, and a gate which are sequentially disposed on the channel, and curing the memory transistor by removing charges or traps existing at least at an interface between the channel and the first insulating layer by generating a gate induced drain leakage (GIDL) current on the drain side of the memory transistor and using Joule heating caused by the GIDL current.

21 Claims, 12 Drawing Sheets

< Comparative Example >

(A) [ Before GIDL annealing ]

(B) [ After GIDL annealing ]

NONVOLATILE MEMORY DEVICE AND OPERATION METHOD THEREOF

CROSS REFERENCE TO RELATED APPLICATION

The present application claims, under 35 U.S.C. § 119 (a), the benefit of Korean Patent Application No. 10-2022-0039113, filed on Mar. 29, 2022, which is herein incorporated by reference in its entirety.

BACKGROUND

1. Field

Embodiments of the present disclosure relate to a semiconductor device and an operating method thereof, and more particularly, to a nonvolatile memory device and an operating method thereof.

2. Description of the Related Art

Unlike volatile memories such as a dynamic random access memory (DRAM) and a static random access memory (SRAM), a memory that retains previously stored data even when power is not supplied thereto is referred to as a nonvolatile memory. As a nonvolatile memory, a flash memory, a resistive random access memory (ReRAM), a phase-change RAM (PCRAM), a magnetic RAM (MRAM), and the like are being developed and studied.

A flash memory is a nonvolatile recording device capable of electrically erasing and rewriting data, and is widely used in various fields. The flash memory has advantages of free input and output of information, high speed, and low power consumption. In addition, the flash memory has advantages in that it is smaller in size than a read-only memory (ROM), very resistant to mechanical shock, and resistant to direct sunlight, high temperature, and moisture as compared to magnetic media or optical media.

However, in a flash memory, when interface traps and fixed charges are generated at a bonding interface between a channel and a tunnel insulating layer of a memory transistor, a threshold voltage of the memory transistor is changed and thus operation durability thereof is deteriorated. In severe cases, operation errors may occur. In particular, in the case of a NAND flash memory, generation of interface traps and fixed charges may not be avoided due to the accumulation of frequent write and erase operations, and thus problems related thereto may be worse.

As a way to solve the above problems, a technology for removing the interface traps and fixed charges through a wafer-scale global annealing (i.e., a full-scale heat treatment) process is being studied. However, in the case of such a global annealing process, there is a problem in that a furnace equipment and additional devices are required, and high cost occurs because a considerable amount of power is used. Also, since the global annealing process is applied on a wafer scale, thermal damage may be generated by affecting a portion of a wafer which does not require additional annealing. In addition, there is a problem in that the global annealing process may not be applied on a unit chip or unit device scale in a product that has been completely delivered other than on the wafer scale. Therefore, it is necessary to develop a technology capable of overcoming the above problems and limitations of the global annealing process and solving the reliability degradation problem in nonvolatile memory devices such as flash memories.

SUMMARY

A technological object to be achieved by the present disclosure is to provide an operating method capable of easily curing and improving the characteristic and reliability of a nonvolatile memory device at a unit device or unit transistor level (or scale) at low cost without additional equipment or excessive power consumption.

In addition, a technological object to be achieved by the present disclosure is to provide a nonvolatile memory device to which the above operating method is applied.

The objects to be solved by the present disclosure are not limited to the objects mentioned above, and other objects not mentioned will be understood by those skilled in the art from the description below.

According to one embodiment of the present invention, there is provided an operating method of a nonvolatile memory device comprising providing the nonvolatile memory device including a memory transistor, the memory transistor including a source, a drain, a channel disposed between the source and the drain, and a first insulating layer, a charge storage layer, a second insulating layer, and a gate which are sequentially disposed on the channel; and curing the memory transistor by generating a gate induced drain leakage (GIDL) current on a drain side of the memory transistor and using Joule heating caused by the GIDL current. By the Joule heating, charges or traps existing on at least an interface between the channel and the first insulating layer may be removed.

Before the curing the memory transistor, the method may further include performing a write and erase cycle for writing data to the memory transistor and erasing the data from the memory transistor; and determining whether at least one of a subthreshold swing (SS) value and an on-current level of the memory transistor has changed by a threshold change amount or more from a reference value, and in the determining, when at least one of the SS value and the on-current level is changed by more than or equal to the threshold change amount, the curing may be performed.

Before performing the write and erase cycle, the method may further include measuring at least one of an SS value and an on-current level of the memory transistor.

After the curing, the method may further include measuring at least one of an SS value and an on-current level of the memory transistor.

The method may further include performing a write and erase cycle for writing and erasing data to and from the memory transistor a given number of times, and may execute alternately and repeatedly the performing of the write and erase cycle the given number of times and the curing of the memory transistor.

In the curing the memory transistor, the GIDL current may be generated by applying a gate voltage of about −5 V to 0 V to the gate and a drain voltage of about 5 V to 15 V to the drain.

In the curing, a time period for applying a gate voltage to the gate and a drain voltage to the drain to generate the GIDL current may be about 50 μs to about 300 μs.

At least a portion of the channel may be heated to a temperature of about 550° C. to 700° C. by the Joule heating caused by the GIDL current.

The nonvolatile memory device may be a flash memory device.

The memory transistor may have a silicon-oxide-nitride-oxide-silicon (SONOS) structure.

The memory transistor may have a gate-all-around (GAA) structure.

According to another embodiment of the present invention, there is provided a nonvolatile memory device comprising a memory array including a memory transistor, the memory transistor including a source, a drain, a channel disposed between the source and the drain, and a first insulating layer, a charge storage layer, a second insulating layer, and a gate which are sequentially disposed on the channel; and a control circuit electrically connected to the memory array to control an operation of the memory transistor, wherein the control circuit is configured to cure the memory transistor by generating a gate induced drain leakage (GIDL) current on a drain side of the memory transistor and using Joule heating caused by the GIDL current.

The control circuit may be configured to perform a write and erase cycle for writing data to the memory transistor and erasing the data from the memory transistor, and to determine whether at least one of a subthreshold swing (SS) value and an on-current level of the memory transistor is changed by a threshold change amount or more from a reference value, and wherein, in the determining, when at least one of the SS value and the on-current level is changed by the threshold change amount or more, the control circuit may be configured to cure the characteristic of the memory transistor by generating the GIDL current.

The control circuit may be configured to measure at least one of an SS value and an on-current level of the memory transistor before performing the write and erase cycle.

The control circuit may be configured to measure at least any one of an SS value and an on-current level of the memory transistor after curing the characteristic of the memory transistor.

The control circuit may be configured to perform a write and erase cycle for writing and erasing data to and from the memory transistors a given number of times, and the control circuit may be configured to alternately and repeatedly perform the performing of the write and erase cycle the given number of times and the curing of the memory transistors.

The control circuit may be configured to generate the GIDL current by applying a gate voltage of about −5 V to 0 V to the gate and applying a drain voltage of about 5 V to 15 V to the drain in order to cure the characteristic of the memory transistor.

The control circuit may be configured to generate the GIDL current by applying a gate voltage to the gate and a drain voltage to the drain for a time period of about 50 μs to 300 μs in order to cure characteristic of the memory transistor.

At least a portion of the channel may be heated to a temperature of about 550° C. to 700° C. by the Joule heating caused by the GIDL current.

The nonvolatile memory device may be a flash memory device.

The memory transistor may have a silicon-oxide-nitride-oxide-silicon (SONOS) structure.

The memory transistor may have a gate-all-around (GAA) structure.

According to embodiments of the present disclosure, it is possible to implement a method which may easily cure and improve the characteristic and reliability of a nonvolatile memory device in a unit device (or unit transistor) level (or scale) at low cost without using additional equipment or excessive power, by directly accessing a memory transistor, applying an electrical signal to the memory transistor, and generating heat for self-curing using a structure of the memory transistor.

According to an embodiment of the present disclosure, the above-mentioned method may be internally executed without the use of additional external equipment such as a furnace, and the characteristic and reliability of the nonvolatile memory device may be easily cured without substantially changing or sacrificing the layout of the device. In addition, the method according to the embodiment may be applied at a wafer level, and may be applied selectively in unit device (or unit transistor) units, and may be applied whenever necessary in a unit chip or unit device scale in a product that has been completely delivered.

Therefore, if the embodiments of the present disclosure are employed, it is possible to overcome problems of reliability and performance deterioration due to repeated write and erase operations of the nonvolatile memory device and to improve the reliability, performance, and lifespan of the nonvolatile memory device.

DETAILED DESCRIPTION

Figure 1:
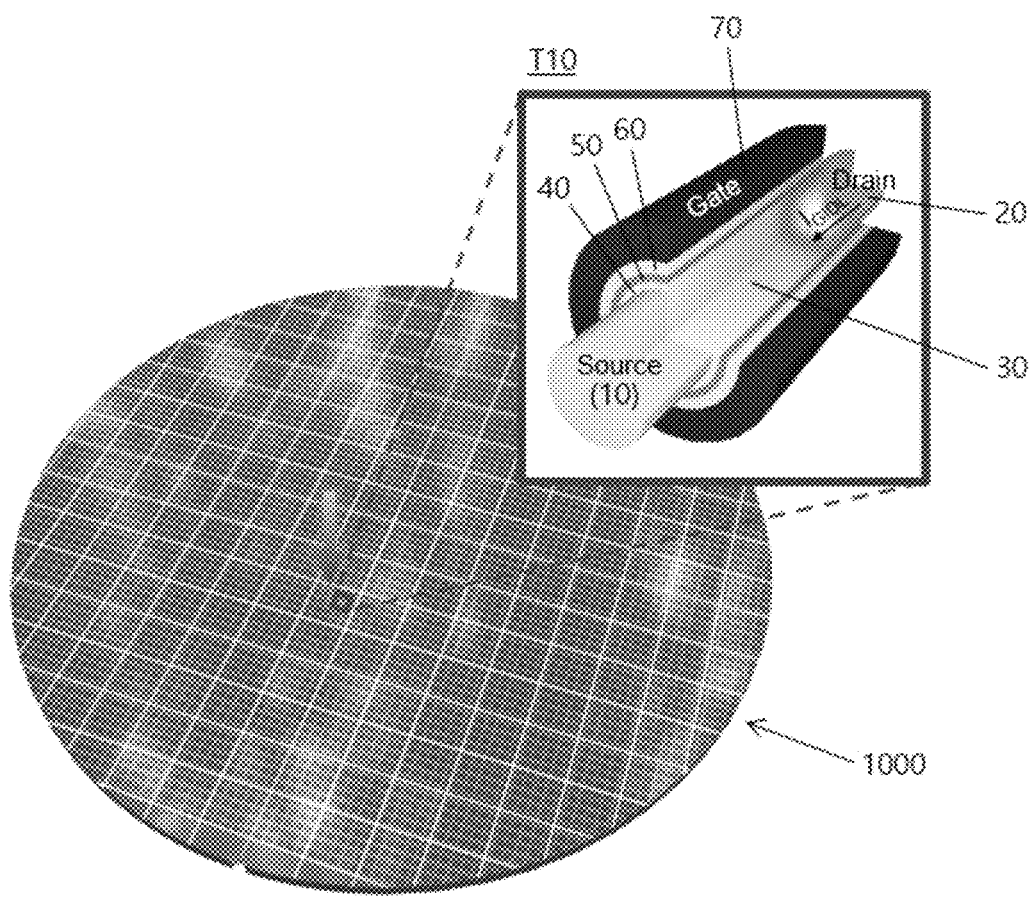
FIG. 1 is a perspective view for explaining an operating method of a nonvolatile memory device according to an embodiment of the present disclosure.

Hereinafter, the embodiments of the present disclosure will be described in detail with reference to the accompanying drawings.

The embodiments of the present disclosure to be described below are provided to more clearly explain the present invention to those having common knowledge in the related art, and the scope of the present invention is not limited by the following embodiments. The following embodiment may be modified in many different forms.

The terminology used herein is used to describe specific embodiments, and is not used to limit the present invention. As used herein, terms in the singular form may include the plural form unless the context clearly dictates otherwise. Also, as used herein, the terms "comprise" and/or "comprising" specifies presence of the stated shape, step, number, action, member, element and/or group thereof; and does not exclude presence or addition of one or more other shapes, steps, numbers, actions, members, elements, and/or groups thereof. In addition, the term "connection" as used herein is a concept that includes not only that certain members are directly connected, but also a concept that other members are further interposed between the members to be indirectly connected.

In addition, in the present specification, when a member is said to be located "on" another member, this includes not only a case in which a member is in contact with another member but also a case in which another member is present between the two members. As used herein, the term "and/or" includes any one and any combination of one or more of those listed items. In addition, as used herein, terms such as "about", "substantially", etc. are used as a range of the numerical value or degree, in consideration of inherent manufacturing and material tolerances, or as a meaning close to the range. Furthermore, accurate or absolute numbers provided to aid the understanding of the present application are used to prevent an infringer from using the disclosed present invention unfairly.

Hereinafter, the embodiments of the present invention will be described in detail with reference to the accompanying drawings. The size or the thickness of the regions or the parts illustrated in the accompanying drawings may be slightly exaggerated for clarity and convenience of description. The same reference numerals refer to the same elements throughout the detailed description.

FIG. 1 is a perspective view for explaining an operating method of a nonvolatile memory device according to an embodiment of the present disclosure.

Referring to FIG. 1, the operating method may include providing the nonvolatile memory device including a memory transistor T10 and curing (or recovering) the memory transistor T10 that is accessed. In FIG. 1, the reference numeral 1000 may denote a 'wafer level device unit,' and the wafer level device unit 1000 may correspond to the nonvolatile memory device. The wafer level device unit 1000 may include a plurality of memory transistors T10. In this specification, the term, 'accessed' means as follows. That is, in order to induce a gate induced drain leakage (GIDL) current IGIDL on a drain side of the memory transistor T10 in a memory cell array in which the memory transistor T10 is disposed, an addressing is made to the memory transistor T10 selected through a row decoder connected through a plurality of word lines and a column decoder connected through selection lines. Then, a signal is applied to a gate and a drain of the selected memory transistor T10 to generate the GIDL current IGIDL on the drain side of the selected memory transistor T10. This may be referred to as the "accessed." Regarding the row decoder and the column decoder, the widely-known technologies may be referred, and the access of the memory transistor T10 is the same as the access to perform read, write, or erase operation on the selected memory transistor T10, and reference may be made to this. Also, as a non-limiting example, the term 'accessed' means selecting a memory transistor in units of memory transistors, units of pages, or units of blocks, but embodiments are not limited thereto.

The memory transistor T10 may be a memory element having a transistor structure. The memory transistor T10 may correspond to one memory cell. The memory transistor T10 may include a source 10, a drain 20, a channel 30 disposed between the source 10 and the drain 20, and a first insulating layer 40, a charge storage layer 50, a second insulating layer 60, and a gate 70 that are sequentially disposed on the channel 30. Here, the first insulating layer 40 may be a tunnel insulating layer, the charge storage layer 50 may be a charge trap layer, and the second insulating layer 60 may be a blocking insulating layer.

The channel 30 may have a nanowire structure. The nanowire may be oriented vertically or horizontally with respect to a main surface of a substrate, but embodiments are not limited thereto. The source 10 may be connected/contact to a first region (or a first end portion) of the channel 30, and the drain 20 may be connected/contact to a second region (or a second end portion) of the channel 30. The source 10, the drain 20, and the channel 30 may form a single nanowire through impurity doping to impart conductivity to the nanowire or formation of an undoped source/drain region. Alternatively, at least a portion of each of the source 10 and the drain 20 may have a shape (or width) that is wider than that of the channel 30.

For example, the gate 70 may be disposed to surround the channel 30. In this case, each of the first insulating layer 40, the charge storage layer 50, and the second insulating layer 60 may be disposed to surround the channel 30 having the nanowire structure. The first insulating layer 40, the charge storage layer 50, the second insulating layer 60, and the gate 70 may be sequentially disposed around the channel 30. In this case, the memory transistor T10 may be said to have a gate-all-around (GAA) structure.

In one embodiment, the channel 30 may include silicon, the first insulating layer 40 may include an oxide, the charge storage layer 50 may include a nitride, the second insulating layer 60 may include an oxide, and the gate 70 may include silicon. In this case, the memory transistor T10 may have a silicon-oxide-nitride-oxide-silicon (SONOS) structure. As a specific example, the channel 30 may include single crystal silicon, and may include a P-type semiconductor doped with a P-type dopant. The first insulating layer 40 may be a silicon oxide layer. The charge storage layer 50 may be a silicon nitride layer. The second insulating layer 60 may be a silicon oxide layer. The gate 70 may include or be formed of polysilicon. The gate 70 may be a layer doped with an N-type dopant. The source 10 and the drain 20 may include single crystal silicon and may be doped with an N-type dopant at a high concentration. However, the specific materials of the aforementioned source 10, drain 20, channel 30, first insulating layer 40, charge storage layer 50, second insulating layer 60, and gate 70 are exemplary and thus may vary depending on embodiments.

When the memory transistor T10 has a GAA type SONOS structure as illustrated in FIG. 1, gate controllability may be improved and problems such as a short channel effect may be suppressed. However, the structure of the memory transistor T10 is not limited to the GAA type SONOS structure, and as is well known in the art, the memory transistor T10 may be implemented in various ways by changing the materials of the first insulating layer 40, the charge storage layer 50, and the second insulating layer 60. For example, other material combinations may be used instead of SONOS, and the memory transistor T10 may have a planar type structure.

The nonvolatile memory device including the memory transistor T10 may be a flash memory device. In this case, the flash memory device may be a NAND type flash memory device or a NOR type flash memory device.

In the embodiment of the present disclosure, the curing of the memory transistor T10 may include removing charges or traps existing at least at an interface between the channel 30 and the first insulating layer 40 by generating the GIDL current IGIDL on a drain side of the memory transistor T10 and using Joule heating caused by the GIDL current IGIDL. The GIDL current IGIDL may be generated by applying a voltage to at least one memory transistor T10 selected from among the plurality of memory transistors T10, and the characteristics of the selected memory transistor T10 may be cured/restored through selective/local heat treatment (or annealing) using the GIDL current IGIDL. Accordingly, the curing/restoration may be selectively performed in units of memory transistors T10, that is, in units of cells, units of pages, or units of blocks.

Figure 2:
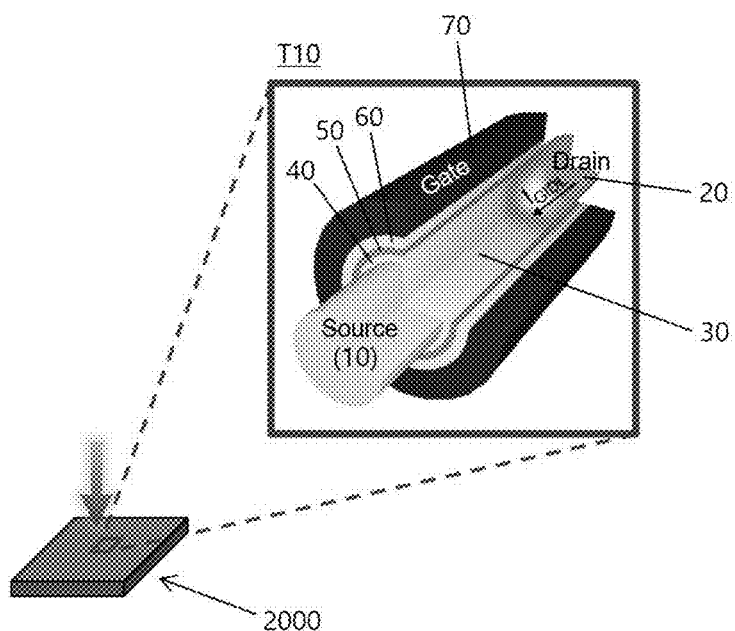
FIG. 2 is a perspective view for explaining an operating method of a nonvolatile memory device according to another embodiment of the present disclosure.

FIG. 2 is a perspective view for explaining an operating method of a nonvolatile memory device according to another embodiment of the present disclosure.

Referring to FIG. 2, the operating method may include providing the nonvolatile memory device including a memory transistor T10 and curing the memory transistor T10 that is accessed. In FIG. 2, the reference number 2000 may be a 'chip level device unit' (or a die level device unit), and the chip level device unit 2000 may correspond to the nonvolatile memory device. The chip level device unit 2000 may be a unit chip which has been completely delivered (or shipped), or may be applied to a predetermined product. The chip level device unit 2000 may include a plurality of memory transistors T10.

The memory transistor T10 may have the same configuration as described in FIG. 1. Also, the curing of the memory transistor T10 may be the same as that described with reference to FIG. 1. That is, the characteristics of the memory transistor T10 may be cured/restored by removing charges or traps existing at least at an interface between a channel 30 and a first insulating layer 40 by generating a GIDL current IGIDL on a drain side of the memory transistor T10 and using Joule heating caused by the GIDL current IGIDL. Thus, the healing/restoration may be selectively performed in units of the memory transistor T10.

Figure 3:
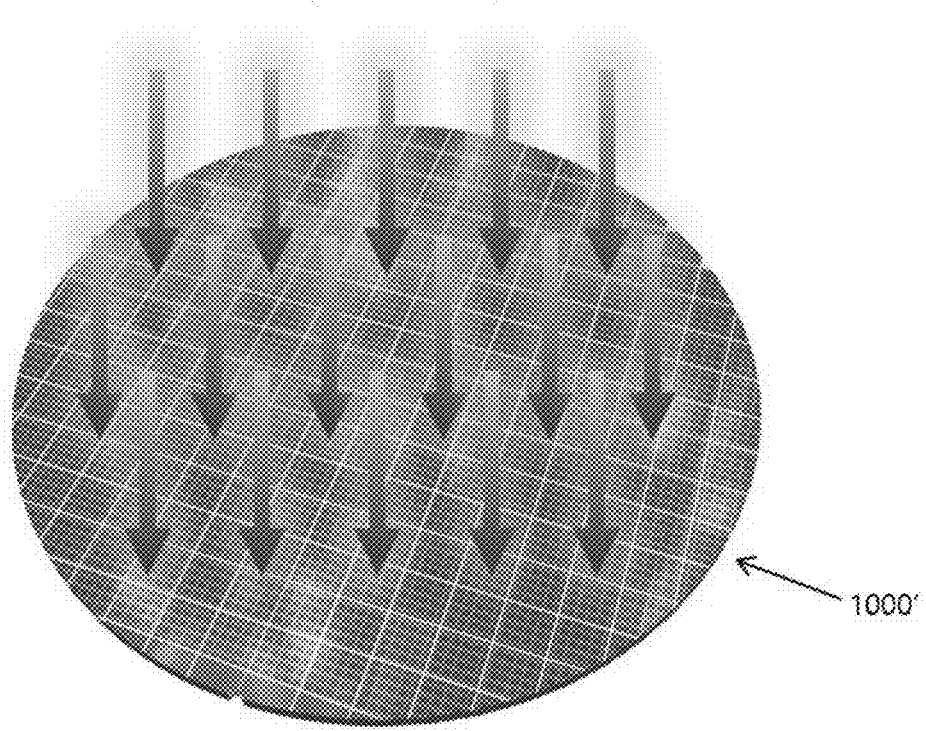
FIG. 3 is a perspective view for explaining an annealing method of a nonvolatile memory device according to a comparative example.

FIG. 3 is a perspective view for explaining an annealing method of a nonvolatile memory device according to a comparative example.

Referring to FIG. 3, the annealing method may include performing full-scale annealing (i.e., global annealing) by heating a wafer level device unit 1000' by using a furnace. Here, the wafer level device unit 1000' may include a plurality of memory transistors. In the case of such a global annealing process, there is a problem in that a furnace equipment and additional devices are required and considerably high power is used, resulting in high cost. In addition, since the global annealing process is applied on a wafer scale, thermal damage may occur by affecting a portion of a wafer which does not require additional annealing. In addition, the global annealing process may not be applied on a unit chip or unit device (or cell) scale in a product that has been completely delivered (or shipped).

However, according to the embodiments of the present disclosure described with reference to FIGS. 1 and 2, it is possible to selectively cure memory transistors constituting corresponding memory cells by addressing selected memory cells. Thus, characteristics and reliability of nonvolatile memory devices may be improved at the unit device (or unit transistor) level (or scale), at low cost without using additional equipment or excessive power. Since the embodiment of the present disclosure uses the GIDL current, which is an operating characteristic inherent in the memory transistor T10, the characteristics and reliability of the nonvolatile memory device may be improved without using additional equipment such as a furnace and sacrificing the layout of the device. In addition, the method according to the embodiment may be applied not only at the wafer level, but may also be applied selectively in a unit device (or unit transistor) unit, and may be applied on a unit chip or unit device scale in a product that has been completely delivered (or shipped).

Figure 4:
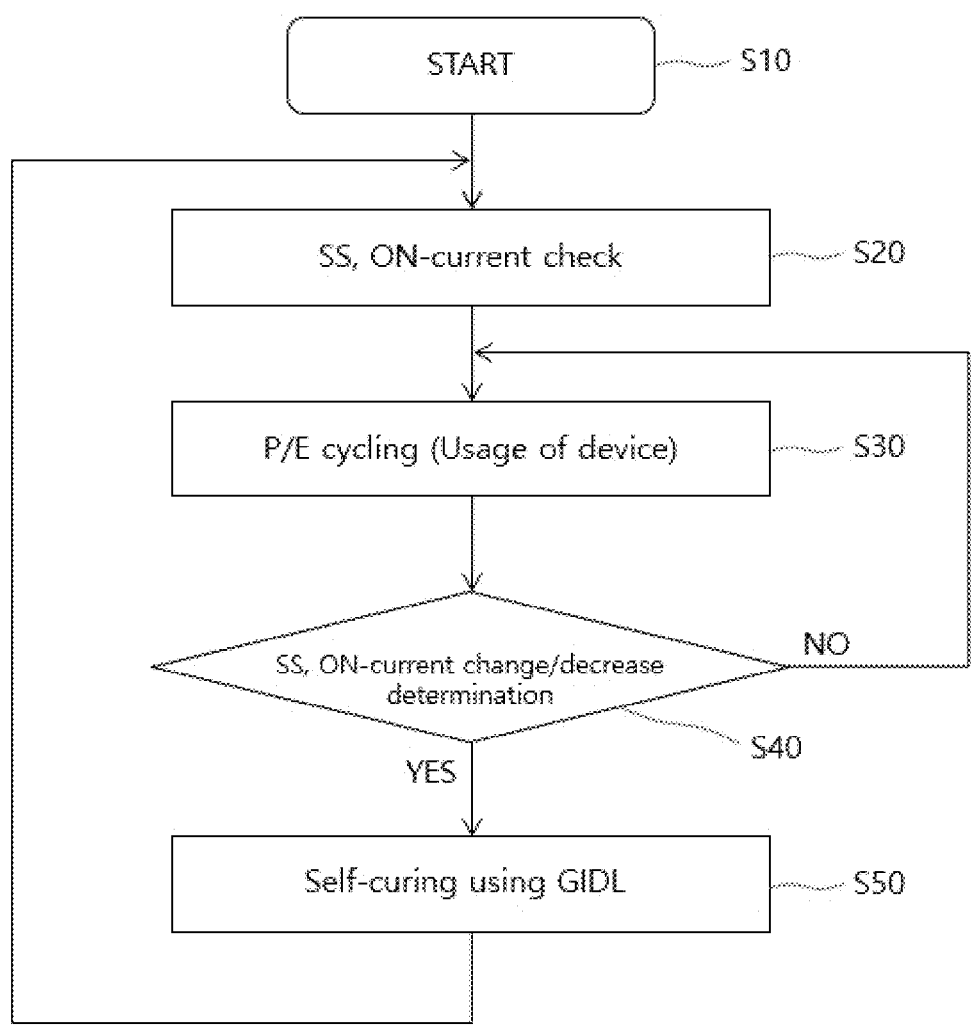
FIG. 4 is a flowchart showing a method of operating a nonvolatile memory device according to an embodiment of the present disclosure.

FIG. 4 is a flowchart showing a method of operating a nonvolatile memory device according to an embodiment of the present disclosure.

Referring to FIG. 4, the method is an operating method for a nonvolatile memory device that includes a memory transistor including a source, a drain, a channel disposed between the source and the drain, and a first insulating layer, a charge storage layer, a second insulating layer, a gate that are sequentially disposed on the channel. Here, the memory transistor and the nonvolatile memory device may correspond to those described with reference to FIGS. 1 and 2.

The method of operating the nonvolatile memory device may include a step S20 for measuring at least one of a sub-threshold swing (SS) value and an on-current level of the memory transistor after a starting step S10. The SS value and/or the on-current level may be used as an index or a reference value for evaluating the characteristics or degree of deterioration of the memory transistor.

The method of operating the nonvolatile memory device may include a step S30 for performing a write and erase cycle (P/E cycle) for writing and erasing data to and from the memory transistor after the step S20. Here, the writing may mean a data writing, that is, data programming, and the erasing may mean a data erasing. Accordingly, the write and erase cycle may be a general use phase of the nonvolatile memory device only as a predetermined number of writing operations, only an erasing operation, or a random operation of predetermined number of writing and erasing. In one embodiment, the programming may mean a process for charging (or trapping) charges in the charge storage layer (or charge trap layer), and the erasing may mean a process for removing the charges in the charge storage layer (or charge trap layer). In the step S30, the writing and erasing may be repeatedly performed a plurality of times. That is, the step S30 may correspond to a general use step of the nonvolatile memory device. As the nonvolatile memory device is used repeatedly, characteristics of the memory transistor may be deteriorated.

After the step S30, the method of operating the nonvolatile memory device may include a step S40 for determining whether at least one of the SS value and the on-current level of the memory transistor has changed from a reference value by a threshold change amount (or critical change amount) or more. The threshold change amount may be determined as a change amount corresponding to a given degree that moves from the reference value. For example, when at least one of the SS value and the on-current level measured in the step S20 is referred to as the reference value, a change amount which is about 20% moved from the reference value may be determined as the threshold change amount. Accordingly, in the step S40, it may be determined whether the SS value or the on-current level of the memory transistor has changed by 20% or more from the initial SS value or the initial on-current level.

In the case of the SS value, since the SS value may increase due to deterioration, a threshold level of the memory transistor may be set to a SS value increased by 20% from the initial SS value. In the case of the on-current level, since the on-current level may be lowered due to the deterioration, the threshold level may be determined according to an on-current level lowered by 20% from the initial on-current level. In the case of the SS value, it may be determined whether or not the SS value has increased by 20% or more from the initial SS value, and in the case of the on-current level, it may be determined whether or not the on-current level has decreased by 20% or more from the initial on-current level. Here, the 20% presented as the criterion of the threshold change amount is non-limiting and only exemplary, and thus it may be changed in various ways as needed. In another embodiment, the threshold change amount may be determined as a change amount of about 5% to 35%. The determining step may be performed in units of memory cells, pages, or blocks, but embodiments are not limited thereto.

When at least one of the SS value and the on-current level is determined as being changed by more than the threshold change amount in the step S40, a step S50 for curing the memory transistor may be performed. The step S50 may include a step for removing charges or traps existing at least at an interface between the channel and the first insulating layer by generating a GIDL current on the drain side of the memory transistor and using Joule heating caused by the GIDL current. Accordingly, the step S50 may be referred to as a 'self-curing' using the GIDL current. The step S50 may correspond to the curing of the memory transistor T10 described with reference to FIGS. 1 and 2.

If at least one of the SS value and the on-current level is determined as not being changed by more than the threshold change amount in the step S40, the method may go back to the step S30 to perform the step S30 again.

The method of operating the nonvolatile memory device may further include a step for measuring at least one of an SS value and an on-current level of the memory transistor after the step S50. For example, after the step S50, the step S20 may be performed again. Accordingly, the steps S20, S30, S40, and S50 may be cycled according to a given scheme.

However, the method of operating the nonvolatile memory device described with reference to FIG. 4 is exemplary, and thus may be modified in various ways according to circumstances. In another embodiment, a method of operating a nonvolatile memory device may include a step for performing a write and erase cycle for writing and erasing data to and from an accessed memory transistor a given number of times and a step for curing the accessed memory transistor. The operating method of the nonvolatile memory device according to the other embodiment may be configured to alternately and repeatedly perform the step for performing the write and erase cycle the given number of times and the step for curing the memory transistor. For example, after performing the write and erase cycle hundreds to thousands of times, the step for curing the memory transistor may be performed, and this process may be repeatedly performed. In addition, the method of operating the nonvolatile memory device may be variously modified and implemented within the scope of the present invention.

In the step for curing the memory transistor, a gate voltage of about −5 V to 0 V or about-5 V to −1 V may be applied to the gate of the memory transistor (e.g., the gate 70 in FIG. 1), and a drain voltage of about 5 V to 15 V or about 8 V to 15 V may be applied to the drain of the memory transistor (e.g., the drain 20 in FIG. 1) in order to generate the GIDL current. At this time, a ground voltage, that is, a voltage (or source voltage) of 0 V may be applied to the source of the memory transistor (e.g., the source 10 in FIG. 1). Under these conditions, GIDL currents with more desirable intensity and density may be generated. The intensity condition of the applied voltages may be adjusted or changed according to circumstances.

In addition, in the step for curing the accessed memory transistor, a time period (i.e., a duration time) for applying the gate voltage to the gate (e.g., the gate 70 in FIG. 1) and the drain voltage to the drain (e.g., the drain 20 in FIG. 1) may be about 50 µs to 300 µs or about 50 µs to 200 µs to generate the GIDL current. When these voltage application times are satisfied, power consumption may be reduced without causing stress to the memory transistor, and the curing (or annealing) process may be performed more efficiently. However, the voltage application times described above may be adjusted or changed according to circumstances.

In addition, at least a portion of the channel (e.g., the channel 30 in FIG. 1) may be heated to a temperature of about 550° C. to 700° C. by Joule heating caused by the GIDL current. Some or most of the channel (e.g., the channel 30 in FIG. 1) may be heated to a temperature of about 550° C. to 700° C., and the first insulating layer (e.g., the first insulating layer 40 in FIG. 1) around the channel (e.g., the channel 30 in FIG. 1) may be heated to a temperature similar to the temperature of about 550° C. to 700°

C. When these heating temperatures are satisfied, charges or traps existing at the interface between the channel and the first insulating layer may be easily removed, As a result, the characteristics of the memory transistor may be effectively cured/restored.

Figure 5:
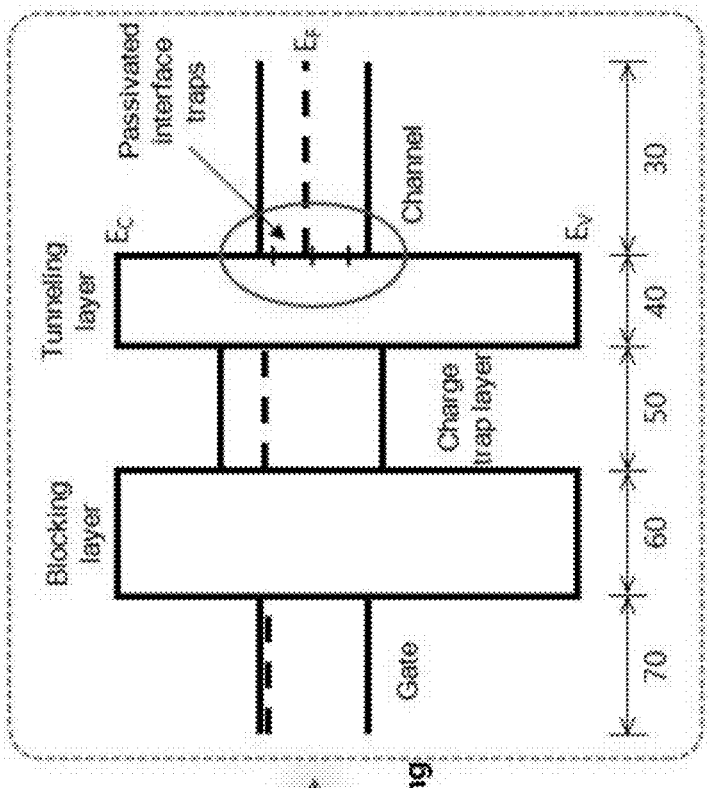
FIG. 5 is an energy band diagram for explaining a state change of a memory transistor according to annealing using a GIDL current in a method of operating a nonvolatile memory device according to an embodiment of the present disclosure.
Figure 5:
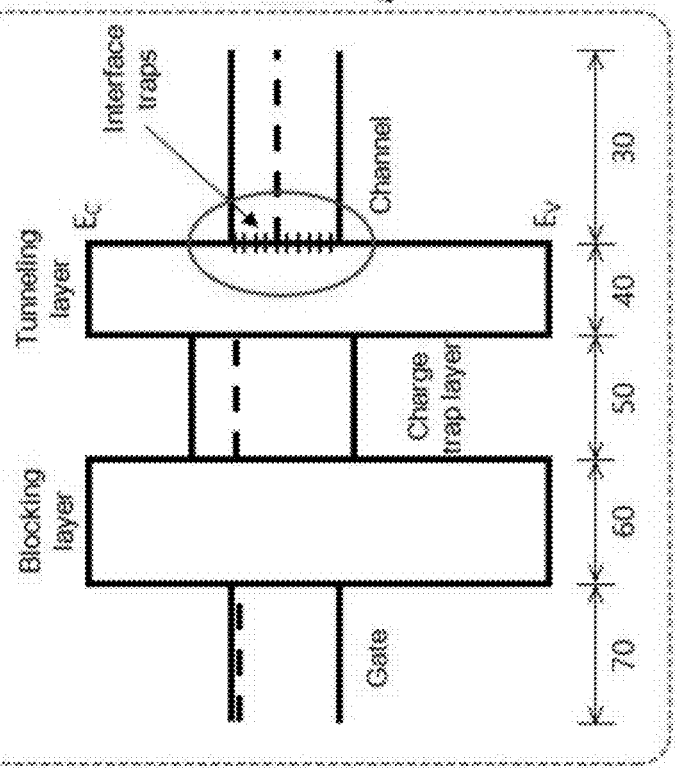

FIG. 5 is an energy band diagram for explaining a state change of a memory transistor according to annealing using a GIDL current in a method of operating a nonvolatile memory device according to an embodiment of the present disclosure. In FIG. 5, $E_C$ denotes the lowest energy level of a conduction band, $E_V$ denotes the highest energy level of a valence band, and $E_F$ denotes the Fermi energy level. The reference numerals 30, 40, 50, 60, and 70 respectively correspond to the components having the same reference numerals, which are described with reference to FIGS. 1 and 2. That is, the reference numerals 30, 40, 50, 60 and 70 denote the channel 30, the first insulating layer 40, the charge storage layer 50, the second insulating layer 60, and the gate 70, respectively. A diagram (A) of FIG. 5 shows a state of the memory transistor before GIDL annealing, and a diagram (B) shows a state of the memory transistor after the GIDL annealing.

Referring to the diagram (A), as the memory transistor is repeatedly used, a large amount of interface traps and fixed charges may be generated at the interface between the channel 30 and the first insulating layer 40. Here, the interface trap may mean a trap site or charges (or electrons) trapped in the trap site. Characteristics and reliability of the memory transistor may deteriorate due to the interface traps and the fixed charges.

Referring to the diagram (B), an annealing (or heat treatment) process using the GIDL current, i.e., GIDL annealing, may be performed, and as a result, some or all of the interface traps and the fixed charges present at the interface between the channel 30 and the first insulating layer 40 may be removed. Accordingly, the reliability may be improved by curing or restoring the memory transistor through the annealing process using the GIDL current.

Figure 6:
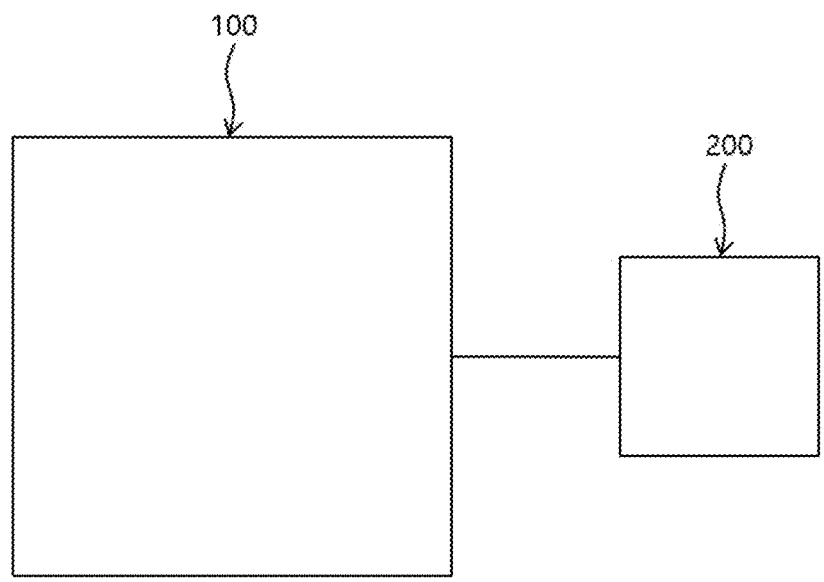
FIG. 6 is a diagram for explaining a nonvolatile memory device according to an embodiment of the present disclosure.

FIG. 6 is a diagram for explaining a nonvolatile memory device according to an embodiment of the present disclosure.

Referring to FIG. 6, the nonvolatile memory device may include a memory array 100 including a plurality of memory transistors, and a control circuit 200 electrically connected to the memory array 100 to control operations of the memory transistors. The memory transistor included in the memory array 100 may be the same as the memory transistor T10 described in FIGS. 1 and 2. Accordingly, the memory transistor may include a source, a drain, a channel disposed between the source and the drain, and a first insulating layer, a charge storage layer, a second insulating layer, and a gate that are sequentially disposed on the channel. The control circuit 200 may be configured to cure the memory transistor by removing charges or traps present at least at an interface between the channel and the first insulating layer by generating a GIDL current on a drain side of the memory transistor and using Joule heating caused by the GIDL current. The curing of the memory transistor performed by the control circuit 200 may correspond to the curing of the memory transistor described with reference to FIGS. 1, 2, 4, and 5. Therefore, the curing technology of the memory transistor described with reference to FIGS. 1, 2, 4, and 5 and the related features may be applied to the control circuit 200.

The control circuit 200 may be configured to perform a write and erase cycle for writing data to the memory transistor and erasing the data from the memory transistor, and to determine whether at least one of a sub-threshold swing (SS) value and an on-current level of the memory transistor is changed by a threshold change amount or more. In the determination, when at least one of the SS value and the on-current level is changed by the threshold change amount or more, the control circuit 200 may be configured to cure the memory transistor by generating the GIDL current.

The control circuit 200 may be configured to measure at least one of the SS value and the on-current level of the memory transistor before performing the write and erase cycle. At this time, the measured SS value and/or the on-current level may be used as an index or a reference value for evaluating the characteristics of the memory transistor.

The control circuit 200 may be configured to measure at least one of the SS value and the on-current level of the memory transistor after curing the memory transistor. At this time, the measured SS value and/or the on-current level may also be used as an index or a reference value for evaluating the characteristics of the memory transistor.

According to another embodiment of the present disclosure, the control circuit 200 may be configured to perform a write and erase cycle for writing and erasing data to and from the memory transistor, and the control circuit 200 may be configured to alternately and repeatedly perform a step for repeatedly performing the write and erase cycle a given number of times and a step for curing the memory transistor.

In addition, according to an embodiment of the present disclosure, the control circuit 200 may be configured to apply a gate voltage of about −5 V to 0 V or about −5 V to −1 V to the gate and to apply a drain voltage of about 5 V to 15 V or about 8 V to 15 V to the drain to generate the GIDL current in order to cure the memory transistor. In addition, the control circuit 200 may be configured to generate the GIDL current by applying the gate and drain voltages to the gate and the drain for a time period of about 50 μs to 300 μs or about 50 μs to 200 μs to cure the memory transistor. Meanwhile, at least a portion of the channel may be heated to a temperature of about 550° C. to 700° C. by Joule heating caused by the GIDL current.

The nonvolatile memory device may be a flash memory device. The memory transistor may have a silicon-oxide-nitride-oxide-silicon (SONOS) structure. Also, the memory transistor may have a gate-all-around (GAA) structure.

In addition, various additional features previously described with reference to FIGS. 1, 2, 4, and 5 may be applied to the nonvolatile memory device of FIG. 6.

Figure 7:
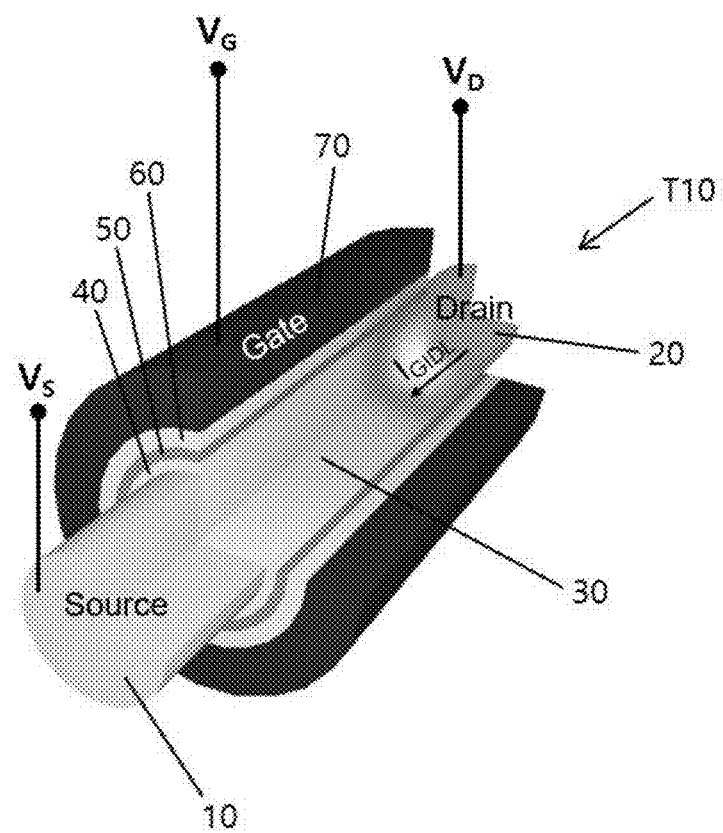
FIG. 7 is a perspective view for explaining voltages which may be applied to a gate, a drain, and a source of a memory transistor to generate a GIDL current according to an embodiment of the present disclosure.

FIG. 7 is a perspective view for explaining voltages which may be applied to a gate 70, a drain 20, and a source 10 of a memory transistor T10 to generate a GIDL current IGIDL for curing the memory transistor T10 according to an embodiment of the present disclosure.

Referring to FIG. 7, in order to generate the GIDL current IGIDL for the curing, a gate voltage $V_G$ corresponding to a turn-off voltage may be applied to the gate 70 of the memory transistor T10, and a drain voltage $V_D$ corresponding to a relatively high bias voltage may be applied to the drain 20. At this time, the source 10 may be grounded. In one embodiment, a voltage (or source voltage $V_S$) of 0 V which is a ground voltage may be applied to the source 10. Here, the gate voltage $V_G$ may be about −5 V to 0 V or about −5 V to −1 V, and the drain voltage $V_D$ may be about 5 V to 15 V or about 8 V to about 15 V. An application time period (i.e., a duration time) of the gate voltage $V_G$ and the drain voltage $V_D$ for generating the GIDL current IGIDL may be about 50 μs to 300 μs or about 50 μs to 200 μs.

When the high bias voltage is applied to the drain 20 and the turn-off voltage is applied to the gate 70, the GIDL current IGIDL may be generated on the drain 20 by the band-to-band-tunneling (BTBT) effect that is caused due to a voltage difference between the gate 70 and the drain 20.

Figure 8:
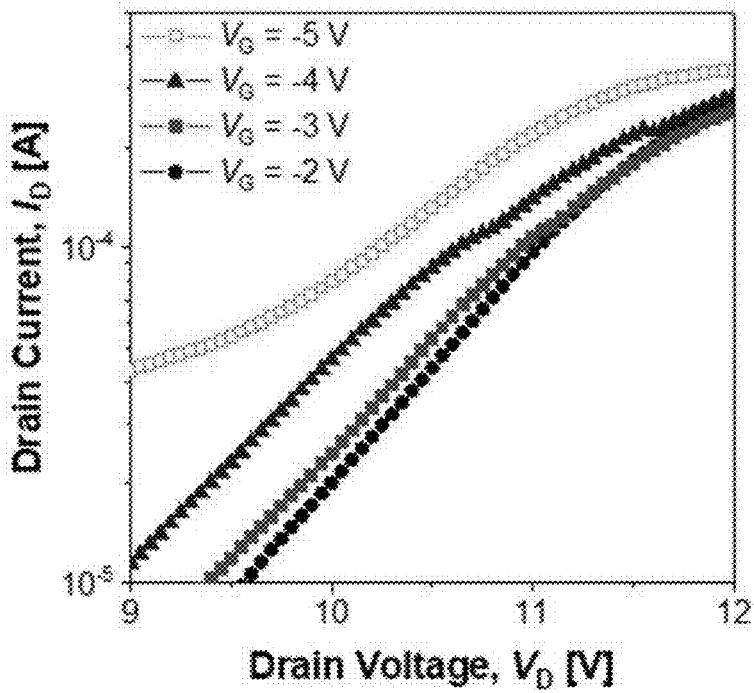
FIG. 8 is a graph showing a change in a GIDL current according to a voltage condition applied to a memory transistor of a nonvolatile memory device according to an embodiment of the present disclosure.

FIG. 8 is a graph showing a change in a GIDL current according to a voltage condition applied to a memory transistor of a nonvolatile memory device according to an embodiment of the present disclosure. Here, the memory transistor has a GAA type SONOS structure. A change in a drain current Ip was measured while changing the intensity of a drain voltage $V_D$ and a gate voltage $V_G$. At this time, the drain current ID corresponds to the GIDL current.

Referring to FIG. 8, the GIDL current (i.e., the Y-axis current value) increases as a difference between the drain voltage $V_D$ and the gate voltage $V_G$ increases. As the drain voltage $V_D$ increases in a positive (+) direction, the GIDL current increases. In addition, as the gate voltage $V_G$ increases in a negative (−) direction, the GIDL current tends to increase.

Figure 9:
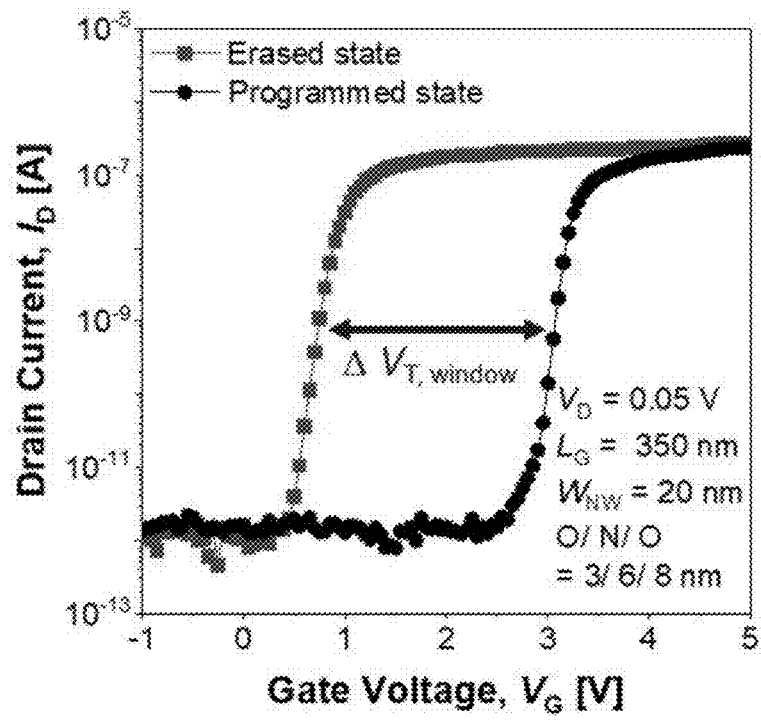
FIG. 9 is a graph showing current-voltage (I-V) curves in each of a programmed state and an erased state of a memory transistor applicable to a nonvolatile memory device according to an embodiment of the present disclosure.

FIG. 9 is a graph showing current-voltage (I-V) curves in each of a programmed state and an erased state of a memory transistor applicable to a nonvolatile memory device according to an embodiment of the present disclosure. Here, the programmed state means a state in which charges are stored in a charge storage layer of the memory transistor, and the erased state means a state in which charges are removed from the charge storage layer.

Referring to FIG. 9, a difference between the I-V curves of the memory transistor in the programmed state and the erased state may be confirmed. An amount of change ($\Delta V_{T,\ window}$) of a threshold voltage corresponding to a memory window may be about 2.33 V. At this time, a drain voltage $V_D$ was 0.05 V, and a gate length $L_G$ in a first direction was 350 nm. A width $W_{NW}$ of a channel in a second direction was 20 nm. Thicknesses of a first insulating layer (oxide), a charge storage layer (nitride), and a second insulating layer (oxide) were 3 nm, 6 nm, and 8 nm, respectively. Here, the first direction may cross the second direction. For example, the first direction may be perpendicular to the second direction.

Figure 10A:
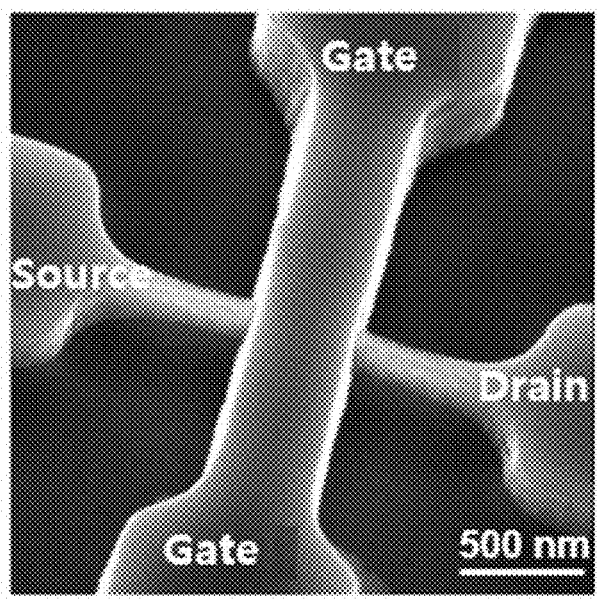
FIG. 10A is a scanning electron microscope (SEM) image of a memory transistor applicable to a nonvolatile memory device according to an embodiment of the present disclosure.

FIG. 10A is a scanning electron microscope (SEM) image of a memory transistor applicable to a nonvolatile memory device according to an embodiment of the present disclosure.

Figure 10B:
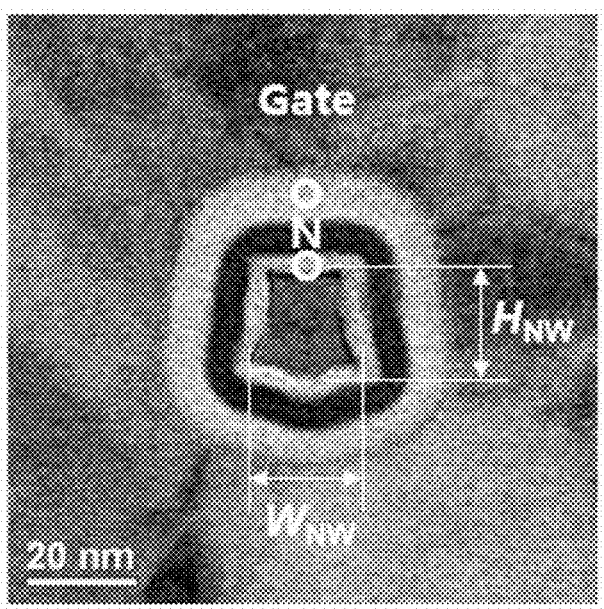
FIG. 10B is a cross-sectional transmission electron microscope (TEM) image of a memory transistor applicable to a nonvolatile memory device according to an embodiment of the present disclosure.

FIG. 10B is a cross-sectional transmission electron microscope (TEM) image of the memory transistor applicable to the nonvolatile memory device of FIG. 10A.

Referring to FIGS. 10A and 10B, the memory transistor may have a GAA type SONOS structure. In the memory transistor, a gate may be disposed to surround a nanowire-shaped channel, and a first insulating layer, a charge storage layer, and a second insulating layer that constitute an ONO structure may be sequentially disposed between the channel and the gate. With respect to the orientation of FIG. 10B, a width of the channel in a horizontal direction may be indicated by $W_{NW}$, and a height (or thickness) of the channel in a vertical direction may be indicated by HNW. However, the structure of the memory transistor shown in FIGS. 10A and 10B is exemplary and may be modified in various ways.

Figure 11A:
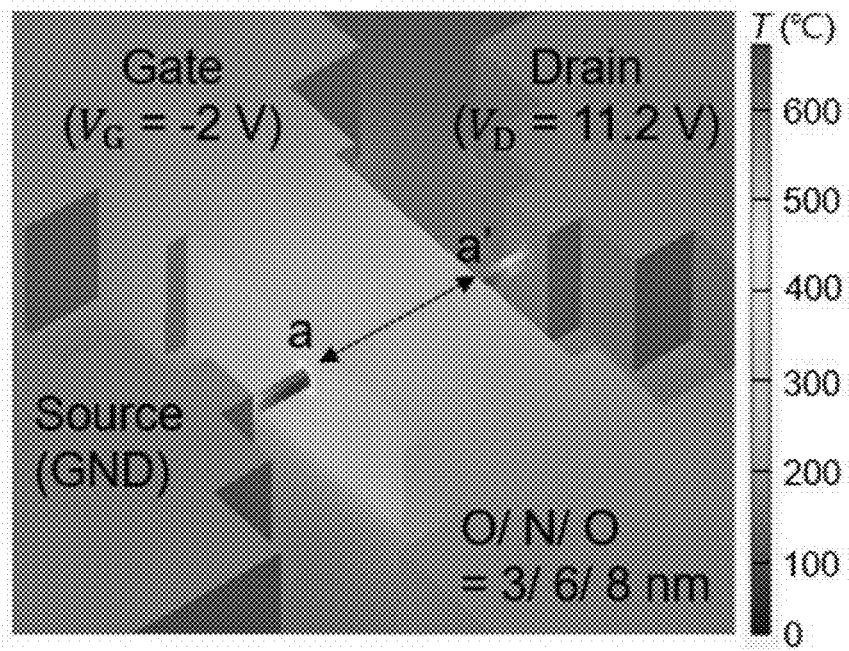
FIGS. 11A and 11B are simulation results showing measurement results of heating characteristics according to Joule heating caused by a GIDL current of a memory transistor, according to an embodiment of the present disclosure.
Figure 11B:
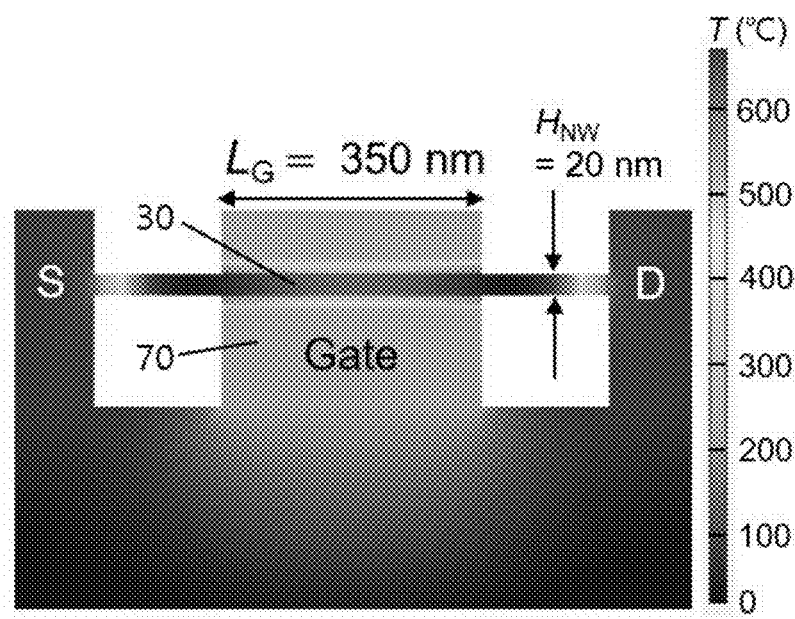

FIG. 11A and FIG. 11B are simulation results showing measurement results of heating characteristics according to Joule heating caused by a GIDL current of a memory transistor according to an embodiment of the present disclosure. The memory transistor of FIGS. 11A and 11B has a structure similar to that of the memory transistor described in FIGS. 10A and 10B. FIG. 11A shows a perspective view of the memory transistor, and FIG. 11B shows a cross-sectional view along a longitudinal direction of a channel 30 of the memory transistor.

Referring to FIG. 11A and FIG. 11B, a gate voltage $V_G$ of −2V, a drain voltage $V_D$ of 11.2V, and a source voltage $V_S$ of 0 V were used to generate the GIDL current, and a voltage application time period (or a duration time) was 100 μs. As a result of the Joule heating caused by the GIDL current, the channel 30 and an area surrounding the channel 30 are heated to a temperature of about 550° C. to 700° C. This may be a temperature suitable (or sufficient) to remove interface traps and fixed charges existing between the channel 30 and a first insulating layer (i.e., a tunnel insulating layer).

Figure 12:
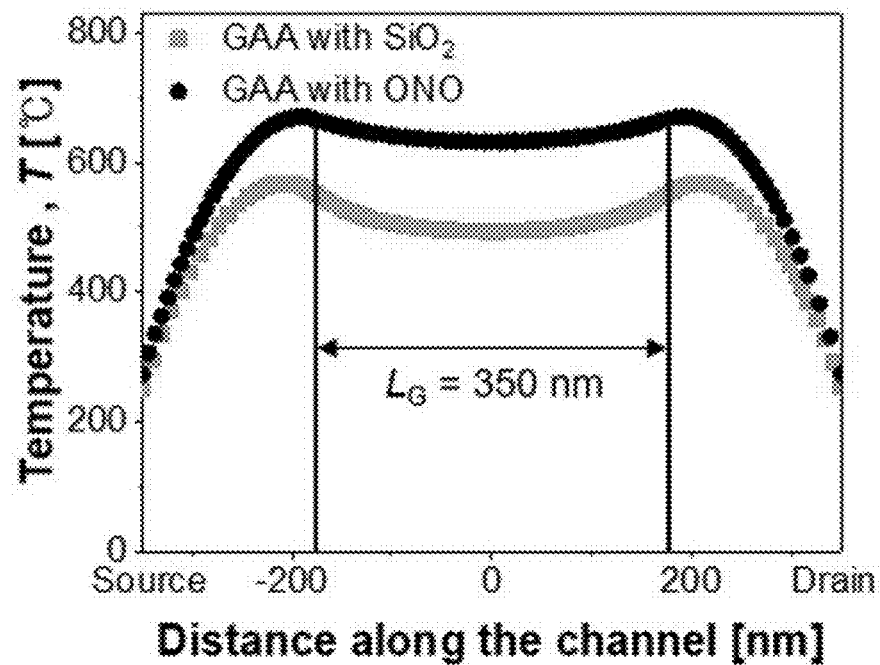
FIG. 12 is a graph showing a lateral temperature distribution along a longitudinal direction of a channel in FIG. 11B.

FIG. 12 is a graph showing a lateral temperature distribution along the longitudinal direction of the channel 30 in FIG. 11B. FIG. 12 includes results for a memory transistor having a GAA type SONOS structure and results for a field effect transistor (FET) of a GAA type in which a single $SiO_2$ layer is embodied instead of an ONO structure.

Referring to FIG. 12, an exothermic temperature of the channel 30 of the memory transistor having the GAA type SONOS structure is significantly higher than that of the channel of the FET of the GAA-type in which the single $SiO_2$ layer is embodied. In addition, in the case of the memory transistor having the GAA type SONOS structure, a relatively uniform temperature distribution is shown in the longitudinal direction of the channel 30 in a channel region corresponding to the gate length $L_G$. This may be due to a heat confinement effect and excellent heat conduction effect in an SONOS memory transistor, i.e., the memory transistor having the GAA type SONOS structure.

Figure 13:
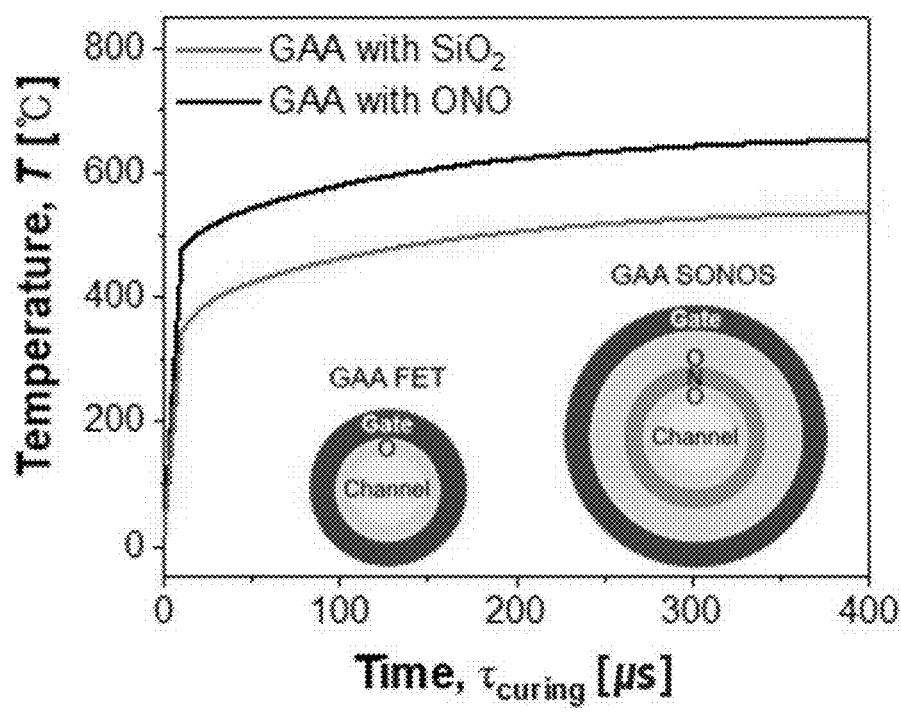
FIG. 13 is a graph showing a change in temperature of a channel according to a voltage application time for generating a GIDL current according to an embodiment of the present disclosure.

FIG. 13 is a graph showing a change in temperature of a channel according to a voltage application time (i.e., a curing time) for generating a GIDL current according to an embodiment of the present disclosure. FIG. 13 includes results for a memory transistor having a GAA type SONOS structure and results for a FET of a GAA type in which a single $SiO_2$ layer is embodied instead of an ONO structure.

Referring to FIG. 13, regardless of the voltage application time (i.e., the curing time) for generating the GIDL current, an exothermic temperature of the channel in the memory transistor having the GAA type SONOS structure is significantly higher than that of the FET of the GAA-type. Thus, electro-thermal annealing (ETA) using the GIDL current may be more effective in an SONOS memory transistor, i.e., the memory transistor having the GAA type SONOS structure, than in a conventional FET, i.e., the FET of the GAA type. This may be due to the effect of heat confinement in the SONOS memory transistor.

Figure 14:
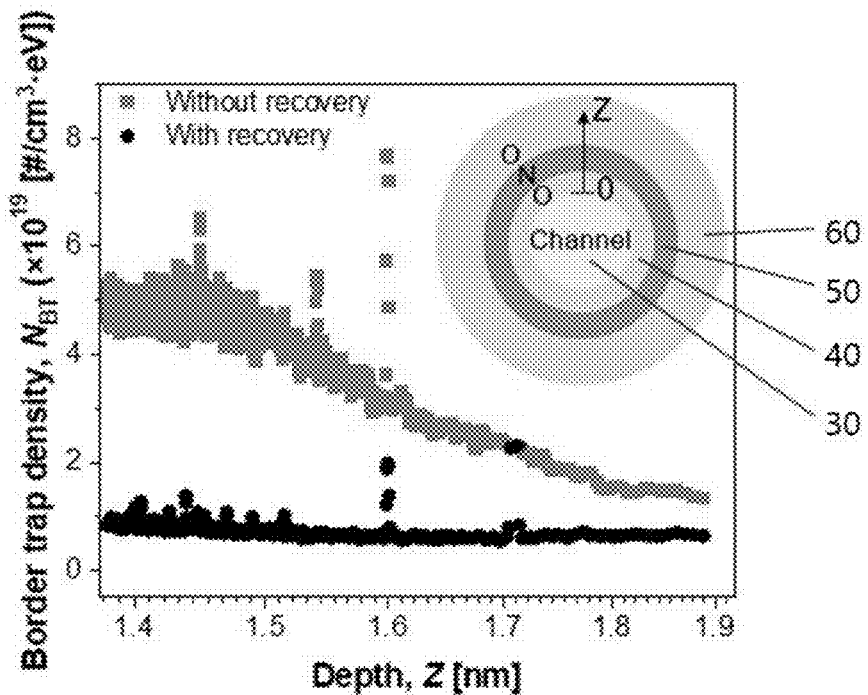
FIG. 14 is a graph showing results obtained by measuring a border trap density of memory transistors in a first case where self-curing using a GIDL current is applied and in a second case where the self-curing using the GIDL current is not applied, respectively.

FIG. 14 is a graph showing results obtained by measuring a border trap density of memory transistors in a first case where self-curing using a GIDL current is applied (i.e., With recovery), and a second case where the self-curing using the GIDL current is not applied (i.e., Without recovery), respectively.

In FIG. 14, when the self-curing is applied (i.e., With recovery), the results are obtained by measuring the border trap density of the memory transistor after performing 10000 P/E cycles while the self-curing is being performed by Joule heating caused by the GIDL current every 2000 P/E cycles. When the self-curing is not applied (i.e., Without recovery), the results are obtained by measuring the border trap density of the memory transistor after performing 10000 P/E cycles without the Joule heating caused by the GIDL current. Here, the border trap density was measured as a profile along a depth Z in an outward direction from an interface between a channel 30 and a first insulating layer 40. At this time, a thickness of the first insulating layer 40 was 3 nm.

The conditions of program, erase, and GIDL Joule heating applied to the measurement of FIG. 14 are shown in below table.

|  | Program | Erase | GIDL Joule heating |
|---|---|---|---|
| $V_G$ | 13 V | −15 V | −2 V |
| $V_D$ | 0 V | 0 V | 11.2 V |
| $V_S$ | 0 V | 0 V | 0 V |
| Time | 100 µs | 10 ms | 100 µs |

Referring to FIG. 14, the border trap density is at a very low level regardless of the depth Z when applying the self-curing (i.e., With recovery). On the other hand, in the case where the self-curing was not applied (i.e., Without recovery), the border trap density was relatively high, and the border trap density tended to increase as the depth Z was getting lower and lower. From these results, it may be confirmed that the self-curing using the GIDL current according to the embodiment of the present disclosure may significantly lower the border trap density between the channel 30 and the first insulating layer 40.

Figure 15:
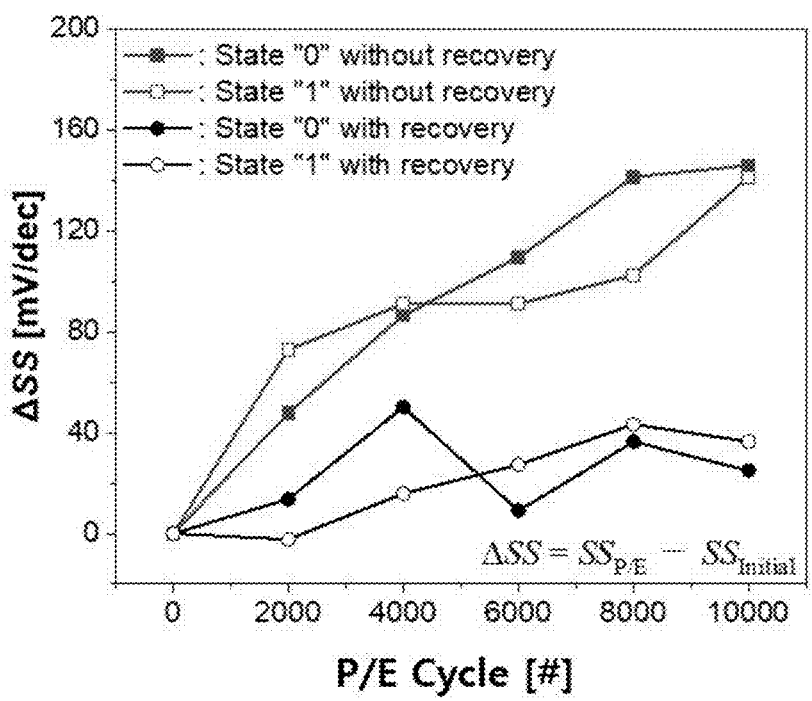
FIG. 15 is a graph showing results obtained by measuring a change ΔSS according to the number of P/E cycles of memory transistors for the first case and the second case.

FIG. 15 is a graph showing results obtained by measuring a change ΔSS according to the number of P/E cycles of memory transistors for the first case and the second case. The first case shows the result of the memory transistor which is self-cured by the Joule heating caused by the GIDL current every 2000 program/erase (P/E) cycles. The second case shows the result of the memory transistor which has performed the P/E cycles without the Joule heating caused by the GIDL current. A state "0" means a programmed state, and a state "1" means an erased state. A Δ SS value means a value obtained by subtracting an SS value $SS_{Initial}$ of a device at an initial stage before performing the P/E cycles from an SS value $SS_{P/E}$ of the device after performing the P/E cycles, that is, $SS_{P/E}-SS_{Initial}$. It means that the memory transistor is more deteriorated as the ΔSS value increases.

Referring to FIG. 15, when the self-curing is applied (i.e., With recovery), the ΔSS value hardly increases even if the number of P/E cycles increases, whereas when the self-curing is not applied (i.e., Without recovery), as the number of P/E cycles increases, the ΔSS values increases significantly. Therefore, when the self-curing is applied (i.e., With recovery), degradation of characteristics of the memory transistor may be effectively suppressed.

Figure 16:
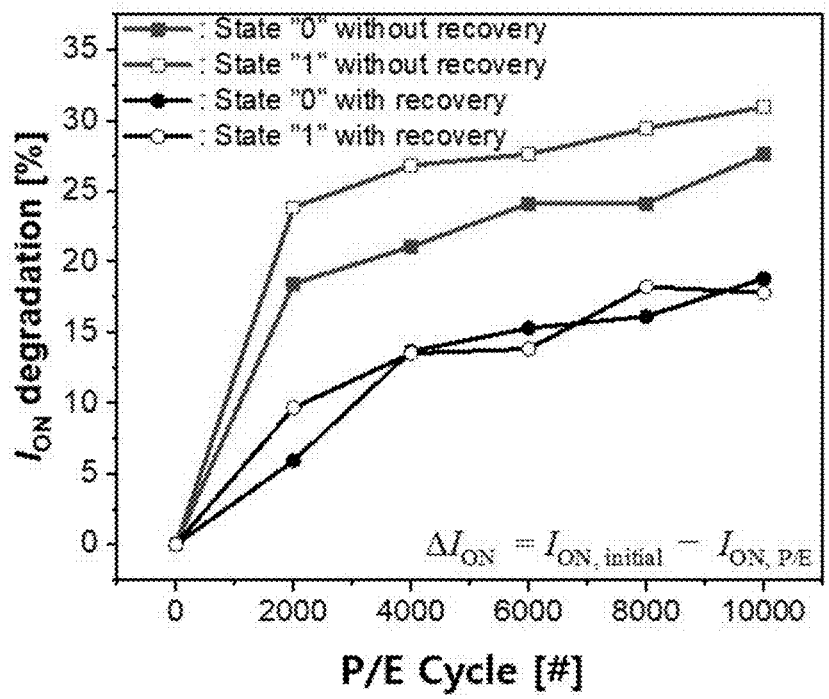
FIG. 16 is a graph showing results obtained by measuring the degree of deterioration of an on-current according to the number of P/E cycles of memory transistors for each of the first case and the second case.

FIG. 16 is a graph showing results obtained by measuring the degree of deterioration of an on-current ION according to the number of P/E cycles of memory transistors for each of the first case and the second case. The first case shows the result for the memory transistor which was self-cured by Joule heating caused by the GIDL current every 2000 program/erase (P/E) cycles. The second case shows the result for the memory transistor which performed the P/E cycles without the Joule heating caused by the GIDL current. A state "0" means a programmed state, and a state "1" means an erased state. The degree of degradation (%) of the on-current ION may be defined as the degree by which the on-current ION is degraded after performing the P/E cycles with respect to an initial on-current.

Referring to FIG. 16, when the self-curing is not applied (i.e., Without recovery), the on-current ION deteriorates (or decreases) by about 30% as the number of P/E cycles performed increases to 10000. In contrast, when applying the self-curing (i.e., With recovery), the degradation of the on-current ION showed a relatively low level such as about 15% even if the number of P/E cycles performed increased to 10000. Accordingly, it may be seen that when the self-curing is applied (i.e., With recovery), the deterioration of the characteristics of the memory transistor related to the on-current ION may be effectively suppressed.

Figure 17:
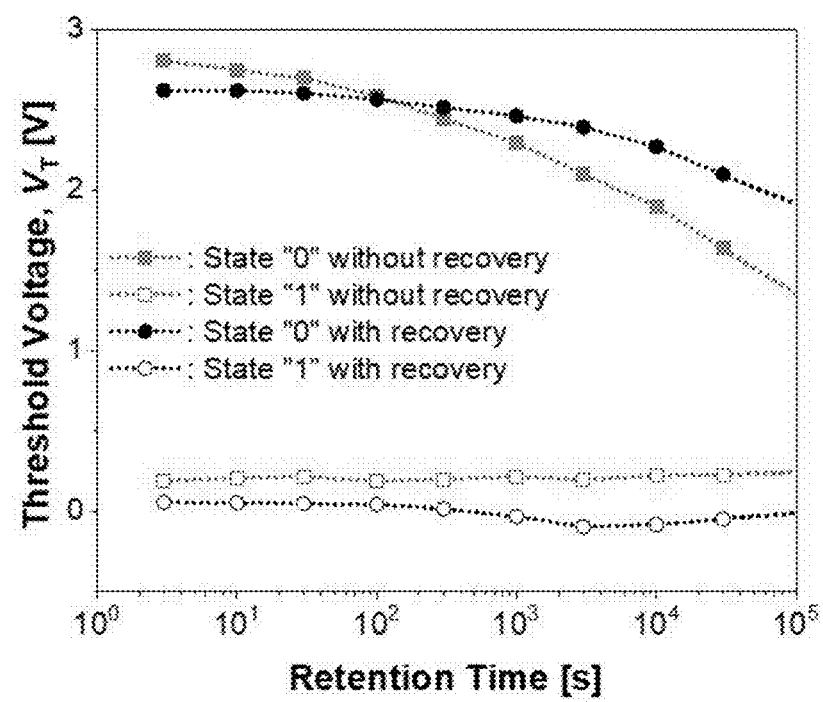
FIG. 17 is a graph showing evaluation results of data retention characteristics of memory transistors for each of the first case and the second case.

FIG. 17 is a graph showing evaluation results of data retention characteristics of memory transistors for each of the first case and the second case. The first case shows the result of the memory transistor which is subject to P/E cycles up to 10000 times while performing the self-curing by the Joule heating caused by the GIDL current every 2000 P/E cycles. The second case shows the result of the memory transistor which is subject to P/E cycling up to 10000 times without performing the self-curing by the Joule heating caused by the GIDL current. A state "0" means a programmed state, and a state "1" means an erased state.

In FIG. 17, referring to the result corresponding to the state "0" without recovery, a threshold voltage $V_T$ clearly decreases as a retention time elapses. This is because charges stored in a charge storage layer (or charge trap layer) may more easily get out over time due to a trap assisted tunneling (TAT) phenomenon caused by interface traps existing between a channel and a first insulating layer (or tunnel insulating layer). On the other hand, referring to the result corresponding to the state "0" with recovery, an amount of change in the threshold voltage $V_T$ is significantly reduced as compared to the result corresponding to the state "0" without recovery. Therefore, when the self-curing is applied (i.e., With recovery), data retention characteristics may be significantly improved.

Figure 18:
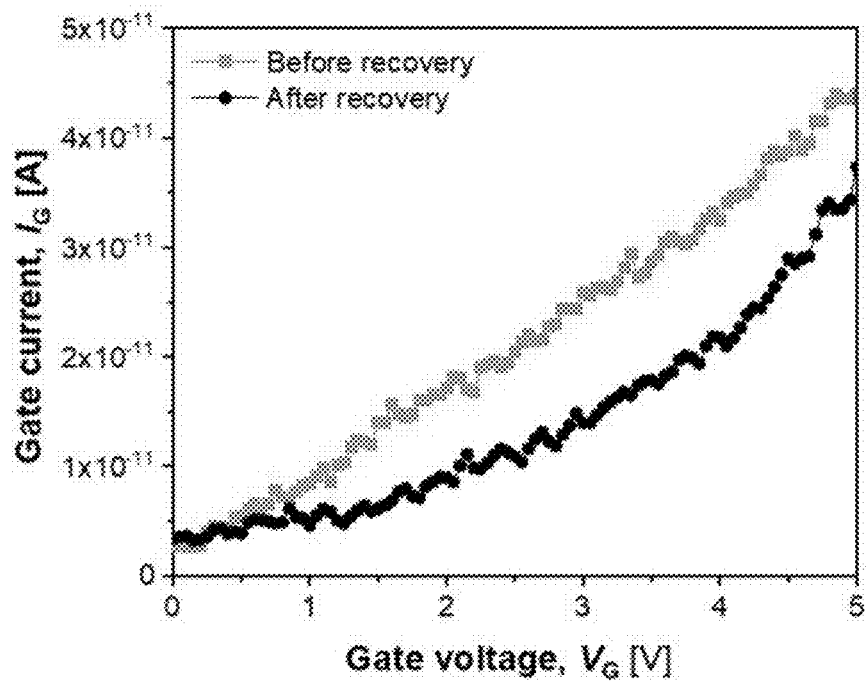
FIG. 18 is a graph showing results obtained by evaluating stress-induced leakage current characteristics before and after performing self-curing using a GIDL current for memory transistors subjected to 10000 P/E cycles.

FIG. 18 is a graph showing results obtained by evaluating stress-induced leakage current (SILC) characteristics before and after performing self-curing using a GIDL current for memory transistors subjected to 10000 P/E cycles.

Figure 19:
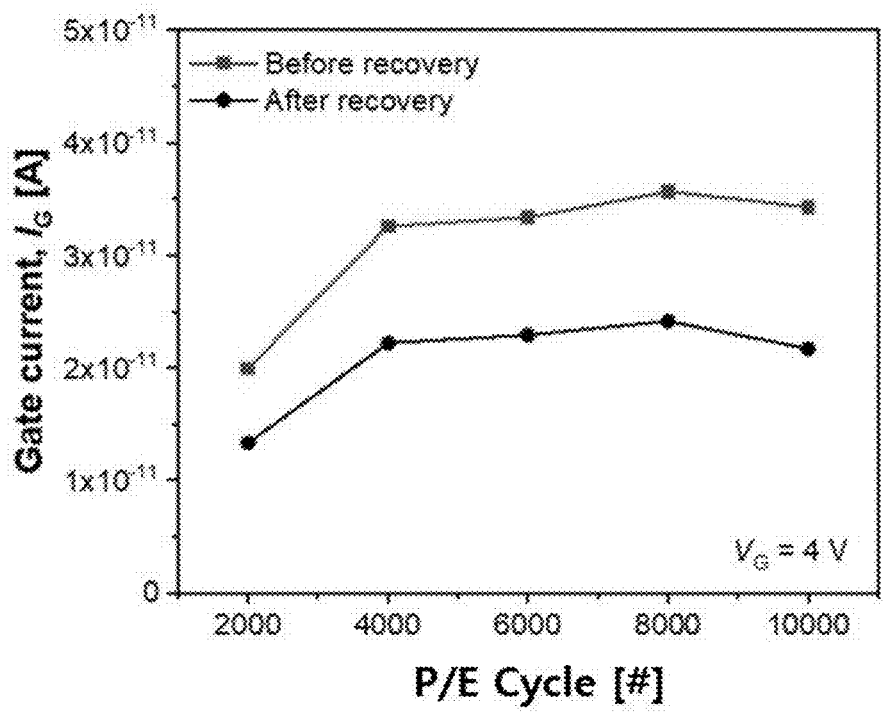
FIG. 19 is a graph showing a change in gate current according to the number of P/E cycles when a gate voltage is 4 V in the results of FIG. 18.

FIG. 19 is a graph showing a change in a gate current IG according to the number of P/E cycles when a gate voltage $V_G$ is 4 V in the results of FIG. 18.

Referring to FIGS. 18 and 19, the SILC characteristic of the memory transistor is greatly changed by the self-curing using the GIDL current. A gate leakage current IG may be significantly reduced by the self-curing using the GIDL current. The gate leakage current IG may be induced by bulk traps ($N_{bulk}$) present in a gate insulating layer (e.g., first and/or second insulating layers). Therefore, the self-curing using the GIDL current is effective in reducing not only border trap density ($N_{bt}$) but also the bulk traps ($N_{bulk}$). In this regard, an effect of remarkably improving the retention characteristics of the memory transistor may be obtained according to the embodiment of the present disclosure.

According to the embodiments of the present disclosure described above, the memory transistor is directly accessed by using a row decoder and a column decoder, an electric signal is applied to the memory transistor, and heat for self-curing is generated by using a structure of the memory transistor. Therefore, it is possible to implement a method of operating a nonvolatile memory device capable of easily curing and improving the characteristics and reliability of the nonvolatile memory device at a unit device (or unit transistor) level (or scale) at low cost without using additional equipment or excessive power. According to an embodiment of the present disclosure, the characteristics and reliability of the nonvolatile memory device may be easily cured without using additional equipment such as a furnace and without substantially changing or sacrificing the layout of the device. In addition, the method according to the embodiment may be applied not only at a wafer level, but also selectively in a unit device (or unit transistor) unit, and may be applied in a unit chip or unit device scale in a product that has been completely delivered (or shipped). Therefore, it is possible to overcome problems of reliability and performance deterioration due to a write and erase operation of the nonvolatile memory device, and to improve reliability, performance, and lifespan of the nonvolatile memory device by using the embodiments of the present disclosure.

In the present specification, the preferred embodiments of the present disclosure have been disclosed, and although specific terms are used, these are only used in a general sense to easily describe the technological contents of the present invention and to help the understanding of the present invention, and are not used to limit the scope of the present invention. It will be apparent to those of ordinary skill in the art to which the present invention pertains that other modifications based on the technological spirit of the present invention may be implemented in addition to the embodiments disclosed herein. It will be appreciated to those of ordinary skill in the art that a nonvolatile memory device and its operating method according to the embodiment described with reference to FIGS. 1, 2, and 4 to 19 may be variously substituted, changed and modified without departing from the spirit of the present invention. Therefore, the scope of the invention should not be determined by the described embodiments, but should be determined by the technological concepts described in the claims.

What is claimed is:

1. An operating method of a nonvolatile memory device, the operating method comprising:
   providing the nonvolatile memory device including a memory transistor, the memory transistor including a source, a drain, a channel disposed between the source and the drain, and a first insulating layer, a charge storage layer, a second insulating layer, and a gate which are sequentially disposed on the channel;
   performing a write and erase cycle for writing data to the memory transistor and erasing the data from the memory transistor; and
   determining whether at least one of a sub-threshold swing (SS) value and an on-current level of the memory transistor has changed by a threshold change amount or more from a reference value;
   curing the memory transistor by generating a gate induced drain leakage (GIDL) current on a drain side of the memory transistor and using Joule heating caused by the GIDL current,
   wherein in the determining, when at least one of the SS value and the on-current level is changed by the threshold change amount or more, the curing is performed.

2. The operating method of claim 1, wherein the curing includes removing charges or traps, existing at least at an interface between the channel and the first insulating layer, using the Joule heating.

3. The operating method of claim 1, further comprising measuring at least one of the SS value and the on-current level of the memory transistor before performing the write and erase cycle.

4. The operating method of claim 1, further comprising measuring at least one of the SS value and the on-current level of the memory transistor after the curing.

5. The operating method of claim 1, further comprising performing a write and erase cycle for writing and erasing data to and from the memory transistor a given number of times, and wherein the performing of the write and erase cycle the given number of times and the curing of the memory transistor are performed alternately and repeatedly.

6. The operating method of claim 1, wherein in the curing, the GIDL current is generated by applying a gate voltage of −5 V to 0 V to the gate and a drain voltage of 5 V to 15 V to the drain.

7. The operating method of claim 1, wherein in the curing, a time period for applying a gate voltage to the gate and a drain voltage to the drain to generate the GIDL current is 50 µs to 300 µs.

8. The operating method of claim 1, wherein at least a portion of the channel is heated to a temperature of 550° C. to 700° C. by the Joule heating caused by the GIDL current.

9. The operating method of claim 1, wherein the nonvolatile memory device is a flash memory device.

10. The operating method of claim 1, wherein the memory transistor may have a silicon-oxide-nitride-oxide-silicon (SONOS) structure.

11. The operating method of claim 1, wherein the memory transistor has a gate-all-around (GAA) structure.

12. A nonvolatile memory device, comprising:
    a memory array including a memory transistor, the memory transistor including a source, a drain, a channel disposed between the source and the drain, and a first insulating layer, a charge storage layer, a second insulating layer, and a gate which are sequentially disposed on the channel; and
    a control circuit electrically connected to the memory array to control an operation of the memory transistor,
    wherein the control circuit is configured to cure the memory transistor by generating a gate induced drain leakage (GIDL) current on a drain side of the memory transistor and using Joule heating caused by the GIDL current, and
    wherein the control circuit is configured to perform a write and erase cycle for writing data to the memory transistor and erasing the data from the memory transistor, and to determine whether at least one of a sub-threshold swing (SS) value and an on-current level of the memory transistor has changed by a threshold change amount or more from a reference value,
    wherein, in the determining, when at least one of the SS value and the on-current level is changed by the threshold change amount or more, the control circuit is configured to cure the characteristic of the memory transistor by generating the GIDL current.

13. The nonvolatile memory device of claim 12, wherein the control circuit is configured to measure at least one of the SS value and the on-current level of the memory transistor before performing the write and erase cycle.

14. The nonvolatile memory device of claim 12, wherein the control circuit is configured to measure at least one of the SS value and the on-current level of the memory transistor after curing the characteristic of the memory transistor.

15. The nonvolatile memory device of claim 12, wherein the control circuit is configured to perform a write and erase cycle for writing and erasing data to and from the memory transistor a given number of times, and
    the control circuit is configured to alternately and repeatedly perform the performing of the write and erase cycle the given number of times and the curing of the memory transistor.

16. The nonvolatile memory device of claim 12, wherein the control circuit is configured to generate the GIDL current by applying a gate voltage of −5 V to 0 V to the gate and applying a drain voltage of 5 V to 15 V to the drain in order to cure the characteristic of the memory transistor.

17. The nonvolatile memory device of claim 12, wherein the control circuit is configured to generate the GIDL current by applying a gate voltage to the gate and a drain voltage to the drain for a time period of 50 μs to 300 μs in order to cure characteristic of the memory transistor.

18. The nonvolatile memory device of claim 12, wherein at least a portion of the channel is heated to a temperature of 550° C. to 700° C. by the Joule heating caused by the GIDL current.

19. The nonvolatile memory device of claim 12, wherein the nonvolatile device is a flash memory device.

20. The nonvolatile memory device of claim 12, wherein the memory transistor has a silicon-oxide-nitride-oxide-silicon (SONOS) structure.

21. The nonvolatile memory device of claim 12, wherein the memory transistor has a gate-all-around (GAA) structure.

* * * * *